Patented Mar. 6, 1951

2,544,146

UNITED STATES PATENT OFFICE 2,544,146

ADHESIVE COMPOSITION FOR METAL FOIL TO PAPER LAMINATING

Carl R. Erikson, New York, N. Y., assignor to The Arabol Mfg. Co., New York, N. Y., a corporation of New York No Drawing. Application March 29, 1949, Serial No. 84,260

3 Claims. (Cl. 260—8)

The invention relates to adhesives, and more particularly to an adhesive composition suitable for use in the preparation of metal-foil-covered sheets of paper and the like, for example, so-called foil-paper laminates. In the manufacture of these metal foil-paper laminates there are involved a number of problems and requirements which arise chiefly from, or are dependent upon, the qualities of the adhesive used in the lamination process. The adhesive utilized must have certain and very definite physical and chemical properties to function completely satisfactorily in the customary laminating machine, said properties being of necessity confined to very narrow limits. It will be understood, of course, that all the requirements must be met without any resulting sacrifice in the other special qualities that the adhesive must have such as from the adhesion standpoint.

Among the necessary functions of the adhesive from the machining point of view are (1) an operation with a minimum of foaming at an operating speed of 100 yards a minute of material coated, (2) freedom from other physical or chemical change of the adhesive during the agitation or churning in the glue pot, (3) freedom from any deleterious or corrosive effect of the adhesive on the transfer or laminating rolls, and (4) a proper spreading quality of the adhesive on the laminating roll.

Heretofore, in the use of water-resistant adhesive products it was necessary to incorporate a considerable amount of a defoaming agent in the use of adhesive products for this type of work in order to obtain all of the above-noted properties.

It is an object of the present invention to provide a novel adhesive composition of especial value both in respect to the machineability or application of the adhesive and to the properties of the laminate resulting from such application.

A further object of the invention is to provide an adhesive composition particularly fitted to meet the requirements of metal foil to paper lamination.

A still further object of the invention is to provide an adhesive composition which does not require the presence of a defoaming agent in its application, which agents detract from the ultimate adhesion properties in the resulting laminate.

The invention has for an object, also, to provide an adhesive composition for the purpose set forth and which possesses the desirable properties of securing in a delamination test a high percentage of fiber tear in the paper, and also a high percentage of fiber tear in the paper upon delamination after immersion in water for at least 72 hours; also, flexibility of the laminated sheet; absence of odor in the laminate; non-toxicity of the adhesive; and no perceptible corrosion of the metal foil by the adhesive under any atmospheric conditions.

Another object of the invention is to provide an adhesive composition whereby there may be afforded a laminate possessing the noted properties over a period of at least two years, the film of adhesive showing no tendency toward oxidation or other chemical change on prolonged aging.

I am aware that natural and synthetic latex compositions have been used heretofore but these have presented, in addition to great foaming difficulties, the problem of oxidation or other chemical change of the basic polymeric material. The addition of inhibitors or antioxidants thereto is not fully satisfactory and may also introduce other difficulties by virtue of the presence of a non-adhesive substance.

In carrying out the invention, the novel composition is prepared by first mixing, under slow agitation in a suitable tank, a polyvinyl acetate or a polyvinyl butyral resin dispersion with a plasticizer such as dibutyl phthalate or other phthalate derivatives, tricresyl phosphate, and triacetin, etc.

A casein solution is prepared by soaking casein in cold water for about one-half hour, adding 26° Bé. ammonia thereto and then heating the batch to 75° C. When the casein solution attains this temperature, there is added a preservative such as ortho phenyl phenol, phenol, or methyl para hydroxy benzoate. This casein solution is then cooled to 50° C.

Thereupon the casein solution is added very slowly to the mixture of resin dispersion and plasticizer, during continuous agitation thereof.

To this batch is then added very slowly a mixture of water, 26° Bé. ammonia, and 40% formaldehyde. The product is then ready, after filtering, for use on a laminating machine in securing metal foil to paper.

The polyvinyl resins used in compounding the novel adhesive may be of the class of typical commercial products which are marketed at about 55% solids content. It is desirable that the particles of said dispersed polyvinyl resin be of a relatively small size, for example less than 2 microns; and it is further desirable that the dispersing agent, or water-soluble colloid utilized in the resin dispersion, should be somewhat water-resistant and/or be present in a relatively small amount. These factors contribute greatly to the good water resistance of the bond which is obtained in the laminate. The dibutyl phthalate or like plasticizer contributes to good adhesion through a more intimate coalescence of the resin particles and, of course, imparts flexibility to the finished sheet. The sensitivity of the adhesive film to heat may be varied, if necessary, by changing the plasticizer content.

The addition of casein to the dispersion improves the adhesion and makes it possible to obtain a workable viscosity at a much lower solids concentration of the finished product than would be possible without it. The use of aqueous solutions, for example, of ammonia and of methyl amine, or the use of morpholine as solubilizing agents is preferred over other alkalis since such agents are volatile and thus will not unduly affect the water resistance of the film. The addition of formalin increases this water resistance even further.

It will be understood, of course, that the proportions of the various ingredients will within limits depend upon the particular conditions to be met, for example, with the specific ingredients hereinafter noted they may vary substantially as follows—all parts being by weight:

| Ingredient | | |
|---|---|---|
| Polyvinyl acetate dispersion | 40 | –75 |
| Dibutyl phthalate | 2 | –14 |
| Casein | 2 | –10 |
| Water (1) | 10 | –35 |
| Ammonia 26° Bé. (1) | 0.2 | – 1 |
| Ortho phenyl phenol | 0.1 | – 1 |
| Water (2) | 1 | – 8 |
| Ammonia 26° Bé. (2) | 0.05 | – 0.4 |
| Formaldehyde 40% | 0.025 | – 0.6 |

A specific composition and typical example which has been found particularly suitable for aluminum foil to paper lamination has the following formula:

| Ingredient | |
|---|---|
| Polyvinyl acetate dispersion | 61.70 |
| Dibutyl phthalate | 4.00 |
| Casein | 6.00 |
| Water (1) | 22.40 |
| Ammonia 26° Bé. (1) | 0.60 |
| Ortho phenyl phenol | 0.45 |
| Formaldehyde 40% | 0.10 |
| Ammonia 26° Bé. (2) | 0.45 |
| Water (2) | 4.30 |

The use of the novel adhesive presents no operating difficulties. In running this adhesive on a coating and laminating machine, operating at the rate of 100 yards a minute of finished product, with an oven temperature of 350° F., a low moisture content of 3–5% in the finished laminate is always obtained. Thus, the adhesive presents no drying problem since it does not contain any hygroscopic agents.

The adhesion obtained is excellent with all types of standard paper or treated paper used in this work such as glassine, imitation glassine, bond, groundwood, and tissue papers. All the excellent characteristics of adhesion mentioned previously herein are obtained with all these papers and aluminum foil.

Adhesive characteristics are also good with some other metal foils, but since aluminum is used almost exclusively in metal foil-paper lamination, the greatest work and interest has been with aluminum foil.

I claim:

1. An adhesive composition for use in metal foil to paper laminating, consisting of, in percentages by weight: polyvinyl acetate resin dispersion of 55% solids content, 40–75; dibutyl phthalate, 2–14; casein, 2–10, with water, 10–35, and 26° Bé. ammonia, 0.2–1.0; ortho phenyl phenol, 0.1–1.0; 40% formaldehyde, 0.025–0.6, with 26° Bé. ammonia, 0.5–0.4, and water, 1–8.

2. An adhesive composition for use in metal foil to paper laminating, consisting of, in percentages by weight: polyvinyl acetate resin dispersion of 55% solids content, 61.70; dibutyl phthalate, 4.00; casein, 6.00, with water, 22.40, and 26° Bé. ammonia, 0.60; ortho phenyl phenol, 0.45; 40% formaldehyde, 0.10, with 26° Bé. ammonia, 0.45, and water, 4.30.

3. An adhesive composition for use in metal foil to paper laminating, consisting of, in percentage by weight: polyvinyl acetate resin dispersion of 55% solids content, 40–75, and a plasticizer; casein, 2–10, with water, 10–35, and 26° Bé. ammonia, 0.2–1.0; a preservative; and 40% formaldehyde 0.025–0.6, with 26° Bé. ammonia 0.5–0.4 and water 1–8.

CARL R. ERIKSON.

REFERENCES CITED

The following references are of record in the file of this patent:

UNITED STATES PATENTS

| Number | Name | Date |
|---|---|---|
| 2,047,143 | Iddings | July 7, 1936 |
| 2,191,654 | Haon | Feb. 27, 1940 |
| 2,427,532 | Miskel | Sept. 16, 1947 |
| 2,453,258 | Pearson | Nov. 9, 1948 |

FOREIGN PATENTS

| Number | Country | Date |
|---|---|---|
| 387,736 | Great Britain | Feb. 16, 1933 |

OTHER REFERENCES

Chicago Paint and Varn. Prod. Club., Paint Oil and Chem. Rev., Nov. 14, 1946, pp. 50 to 52.

E. I. du Pont de Nemours Co., Water Emulsions of Polyvinyl Acetate, Received Nov. 13, 1943, pp. 1 to 4.